United States Patent [19]

Davidov et al.

[11] Patent Number: 4,571,622
[45] Date of Patent: Feb. 18, 1986

[54] HYBRID FREQUENCY MODULATION FEEDBACK LOOP REMOTE VOLUME CONTROL CIRCUIT

[75] Inventors: Mircho A. Davidov; Michael L. Tentler, both of San Diego, Calif.

[73] Assignee: Oak Industries Inc., Rancho Bernardo, Calif.

[21] Appl. No.: 614,058

[22] Filed: May 25, 1984

[51] Int. Cl.⁴ .................. H04N 5/44; H04N 5/00; H04N 5/62; H04N 5/60
[52] U.S. Cl. .................. 358/194.1; 358/196; 358/197; 358/198
[58] Field of Search .............. 358/194.1, 197, 196, 358/198

[56] References Cited
U.S. PATENT DOCUMENTS 4,237,485 12/1980 Saito et al. .................. 358/197

Primary Examiner—Michael A. Masinick
Assistant Examiner—E. Anne Toth
Attorney, Agent, or Firm—Kinzer, Plyer, Dorn & McEachran

[57] ABSTRACT

A hybrid TV frequency modulation feedback loop (FMFB) remote volume control includes an RF input and an intercarrier audio detector circuit connected thereto to provide a baseband audio signal. An amplitude control is provided for the audio signal. There are means for using the video carrier at the RF input to provide a signal representative of common mode spurious deviation (CMSD). There are circuit means for combining the common mode spurious deviation signal the amplitude controlled baseband audio signal, from the intercarrier audio detector and for providing an aural carrier signal having common mode spurious deviation and amplitude controlled audio.

7 Claims, 2 Drawing Figures

HYBRID FREQUENCY MODULATION FEEDBACK LOOP REMOTE VOLUME CONTROL CIRCUIT

SUMMARY OF THE INVENTION

The present invention relates to remote volume control circuits for use in connection with television receivers and more particularly in connection with cable television or over-the-air pay television or satellite television converters.

A primary purpose of the invention is an FM feedback loop remote volume control which provides amplitude control of the audio signal free of common mode spurious deviation.

Another purpose is a remote volume control of the type described which maintains the same common mode spurious deviation on both the aural and video carriers for buzz elimination in an intercarrier TV detector.

Another purpose is an aural carrier loop frequency control which is locked to the video carrier, thereby maintaining high accuracy of aural-to-video carrier frequency ratio.

Another purpose is a remote volume control of the type described which permits a wide range of aural carrier frequency deviation control.

Another purpose is a remote volume control of the type described which eliminates many of the stages in the commonly used demodulator/remodulator remote volume control configuration and which requires only a single voltage controlled oscillator.

Another purpose is a remote volume control of the type described which eliminates processing of the video signal, thus maintaining high quality video carrier modulated information.

Another purpose is a remote volume control of the type described which provides demodulated baseband audio free from common mode deviation which baseband audio is suitable for further processing of multi-channel stereo information.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
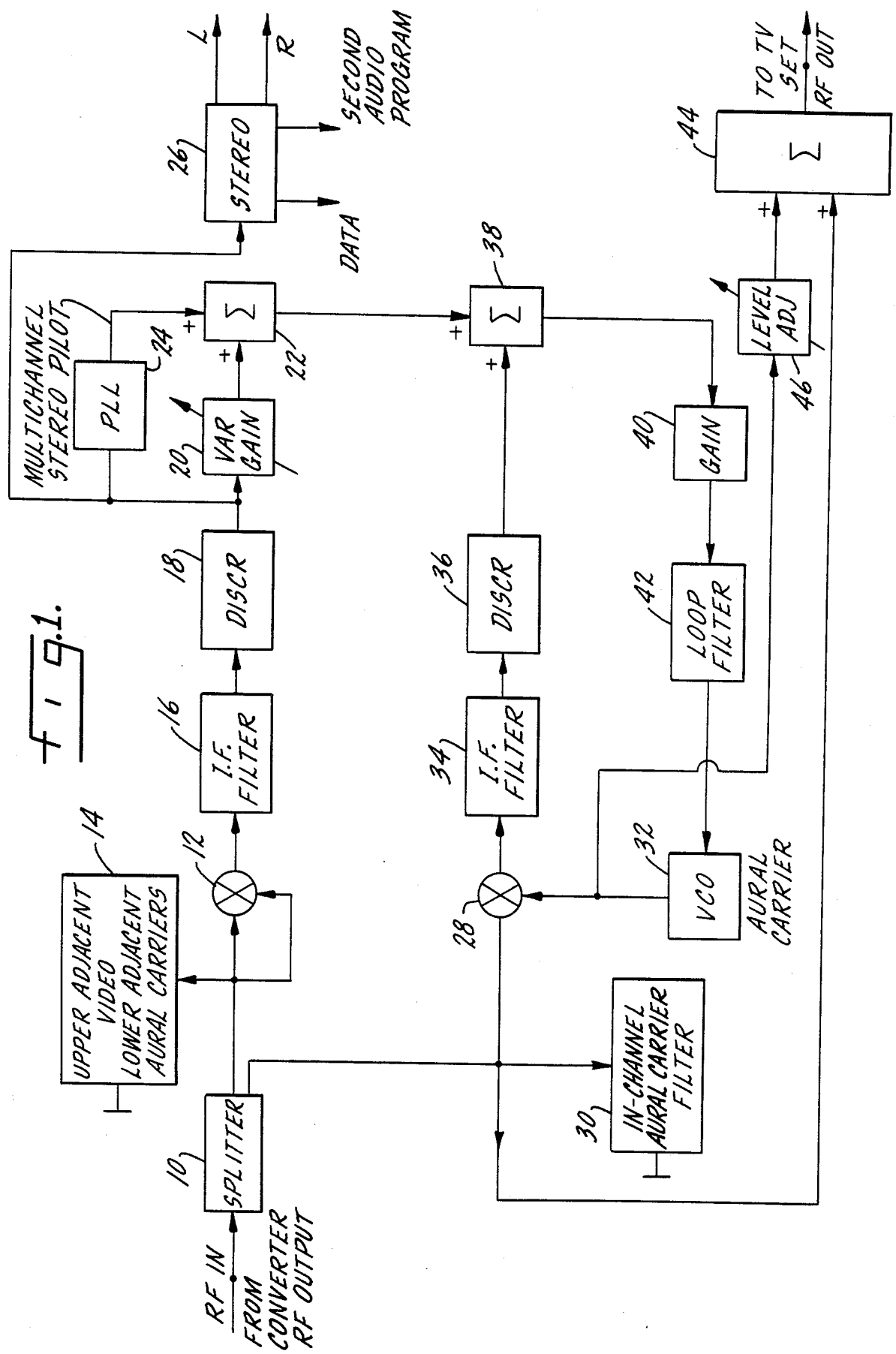
FIG. 1 is a block diagram of one embodiment of a hybrid FMFB remote volume control device.

An FM modulated TV sound signal may be volume controlled by means of a conventional demodulator/-remodulator circuit or by a frequency modulated feedback tracking loop, which is described in copending application Ser. No. 601,595, assigned to the assignee of the present application. The present invention is directed to a third type of volume control circuit which may be considered as a hybrid FMFB-FM demodulator/remodulator circuit.

In a TV set or a television converter or any other form of device which converts input RF signals to an output signal of a designated carrier frequency, due to imperfections of the tuners, phase noise or spurious common mode frequency deviation is introduced in both the video and aural carriers as they are converted by the tuner. Thus, a separate (independent of the video) aural carrier FM demodulator will introduce an audible buzz proportional to the spurious deviation of the aural carrier. In a TV set, an intercarrier sound FM demodulator eliminates this problem by first multiplying the aural carrier with the visual carrier, thus eliminating the common mode spurious FM deviation. The output formed by multiplying the aural and video carrier, a 4.5 MHz IF signal, is then FM demodulated. To prevent buzz, the common mode spurious FM must be preserved on both the aural and video carriers in any aural FM deviation compression arrangement in any type of cable television or subscription television converter, assuming that the television sets used in connection therewith, have an intercarrier detector for audio recovery.

The commonly used demodulator/remodulator volume control circuit amplitude or AM demodulates the video carrier to extract the video and to remove the spurious FM deviation from the video carrier. An intercarrier FM demodulator recovers the sound and eliminates the spurious FM deviation on the aural carrier. Then the demodulated video and sound are again remodulated on RF visual and aural RF carriers, with the result that the common mode spurious deviation is eliminated from both the aural and video carriers. Volume control is accomplished by varying the amplitude of the demodulated audio signal or sound before it is remodulated. This technique has been routinely used in television sets and in baseband set-top converters to achieve remote volume control.

In copending application, Ser. No. 601,595, remote volume control is achieved at RF by utilizing two FMFB loops, one for FM demodulating the aural carrier in a deviation compression loop, and the other for tracking the spurious FM deviation on the video carrier. By combining the signals from the aural FMFB loop with the visual FMFB signal output, the FM deviation on the aural carrier due to the desired sound or audio, can be remotely controlled and the common mode spurious FM deviation remains the same on both the aural and video carriers.

In the present invention the aural carrier is reduced to baseband by intercarrier detection. The gain of the audio signal is then remotely controlled. The video carrier is used to provide a signal proportional to common mode spurious deviation which is then applied to the volume controlled audio signal either at baseband or after the audio has been raised to IF. The volume controlled sound signal with common mode spurious deviation is then modulated to the aural carrier frequency.

In the embodiment of FIG. 1, a splitter 10 receives an RF input from a CATV converter or other subscription TV device and is in turn connected to a mixer 12. Notch filters 14 remove the upper adjacent video channel carrier and the lower adjacent audio channel carrier. The inputs to mixer 12 are the in-channel video and aural carriers with common mode spurious FM thereon. The output from the mixer is a deviation-free audio signal at an IF of 4.5 MHz. This signal is filtered by an IF filter 16 and demodulated by a detector 18 to provide a deviation-free audio signal at baseband frequency. The audio signal is passed through a remote volume control represented by a variable gain circuit 20 and then provides one input for a summing circuit 22. Since the FCC has now approved multi-channel stereo sound in the audio band, a phase-lock loop 24 will process the multi-channel stereo pilot signal normally at horizontal line frequency and will provide this input to summing circuit 22. The variable gain of circuit 20 cannot be applied to the pilot and for that reason the variable gain circuit must be bypassed. Thus, the input to summing circuit 22 is the multi-channel stereo pilot signal and a baseband audio signal free of spurious modulation. A further output from discriminator 18, which is spurious-free audio, is provided to a stereo sound circuit 26 which will provide left and right stereo outputs of the audio signal with no audible buzz or other form of spurious modulation.

The second output from splitter 10 is connected to a mixer 28. Prior to the signal reaching the mixer the in-channel aural carrier signal is removed by a notch filter 30 with the result that the signal applied to mixer 28 is the video carrier with common mode spurious deviation. The second input to mixer 28 is an aural carrier signal from voltage control oscillator (VCO) 32. VCO 32 is in a closed loop circuit with a 4.5 MHz IF filter 34 and a discriminator 36, the output of which is connected to a summing circuit 38 which combines the demodulated video common mode spurious deviation, the output from discriminator 36, with the spurious-free baseband audio signal from summing circuit 22. The output from summing circuit 38 is passed through an amplifier 40 and then a loop filter 42 to provide the deviation control input for VCO 32. Thus, the frequency deviation of VCO 32 is controlled by the amplitude of the audio signal as modified by the common mode spurious deviation taken from the video carrier. The output from VCO 32 in addition to being connected to mixer 28 also provides the aural carrier, with common mode spurious deviation thereon, to an additional summing circuit 44. Summing circuit 44 which will provide an RF output for a conventional television set will thereby sum the aural carrier, with common mode spurious deviation, and the video carrier, again with common mode spurious deviation, so that an intercarrier recovery circuit in the television set can function in the normal manner. There may be a level adjust circuit 46 connected between the output of VCO 32 and summing circuit 44 for further adjustment of the level of the aural carrier.

Figure 2:
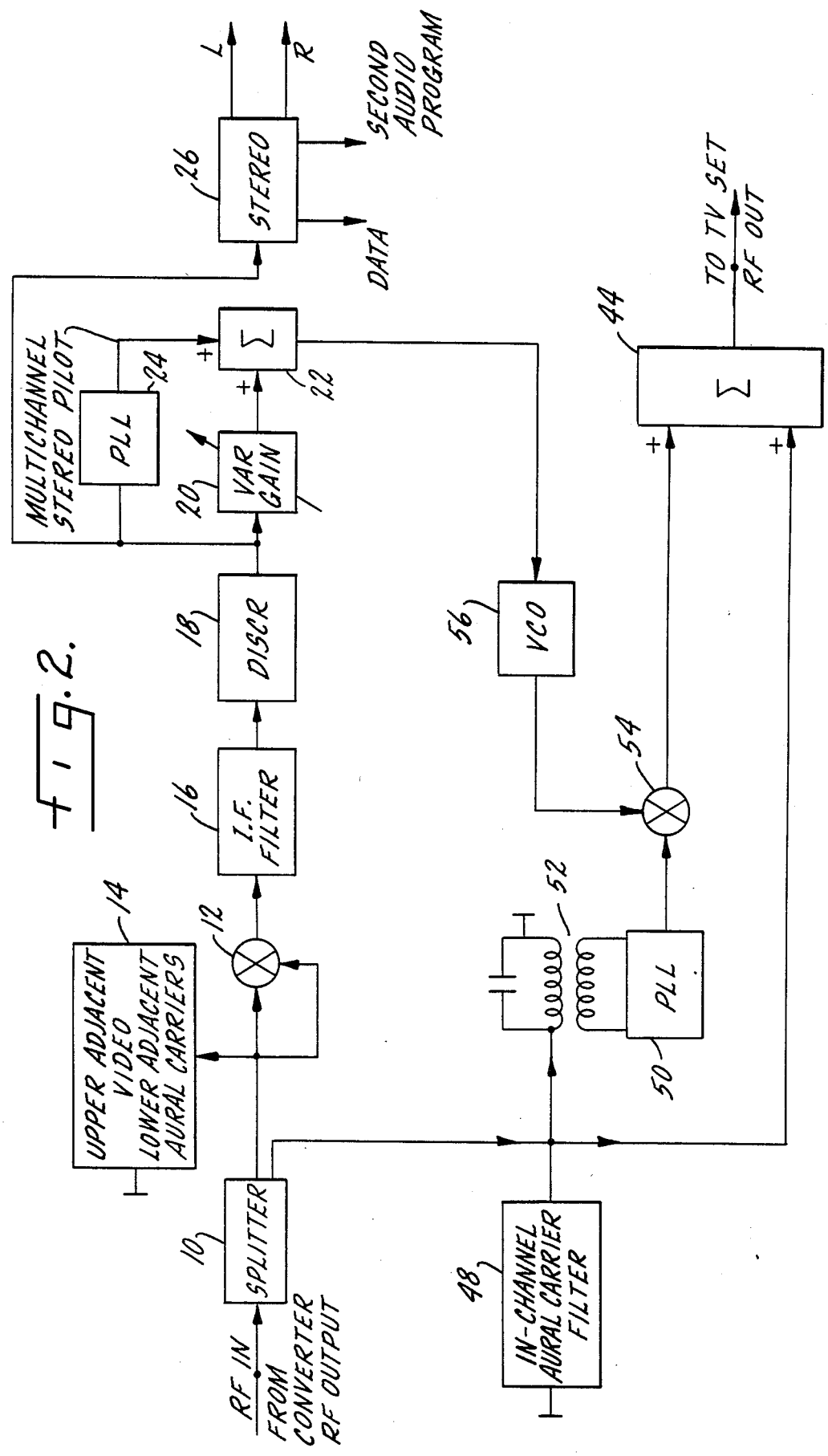
FIG. 2 is a block diagram of a second embodiment.

The circuit of FIG. 2 uses the same form of audio detection circuit as in FIG. 1, with the difference between the two techniques residing in the manner of deriving common mode spurious deviation from the video carrier. Like elements have been given the same reference numerals in the circuits of FIGS. 1 and 2.

In the FIG. 2 embodiment the output from splitter 10 is connected directly to summing circuit 44, as before, to provide a video carrier with common mode spurious deviation. An in-channel audio carrier notch filter 48 removes the audio carrier. A phase locked loop 50 will receive the video carrier with common mode spurious deviation through a transformer 52. Thus, the video carrier at phase lock loop 50 will be injection-locked to the input video carrier and the output from circuit 50 will provide one input for a mixer 54. The other input for mixer 54 is the 4.5 MHz IF output of VCO 56. The frequency deviation control for VCO 56 is provided by the baseband audio output from summing circuit 22. One input for mixer 54 is a spurious-free 4.5 MHz signal whose frequency is directly dependent upon the amplitude of baseband audio. The other input for mixer 54 is a video carrier having common mode spurious deviation with the the mixer being an aural carrier signal with common mode spurious deviation thereon and this output is connected to summing circuit 44, as in the FIG. 1 embodiment.

In both forms of the invention, the audio signal is recovered by an intercarrier circuit in which the in-channel video and audio carriers are mixed to produce spurious-free 4.5 MHz IF. This signal is demodulated to provide baseband audio and the baseband audio is amplitude varied by a remote volume control. A gain controlled audio signal in one embodiment provides the frequency deviation for a VCO at IF frequency with the output of the VCO being mixed with a video carrier signal which is injection-locked to the video carrier input to provide a volume controlled aural carrier having common mode spurious deviation. In the other embodiment, the common mode deviation from the video carrier is provided by a VCO at aural carrier freqency functioning in a closed loop, in which the frequency deviation of the VCO is controlled, again by the baseband audio signal, but in combination with the common mode spurious deviation taken from the video carrier.

The invention is particularly advantageous in that it provides remote volume control of the audio or sound signal with fewer stages than in conventional techniques. Only a single VCO is utilized. The video signal itself is not processed by the circuit, thus maintaining a high quality video carrier. The output from the audio recovery circuit also permits processing of multi-channel stereo signals recently approved by the FCC. Further, the audio carrier loop frequency is locked to the video carrier, thus maintaining a high degree of accuracy of the aural-to-video carrier frequency ratio.

Whereas the preferred form of the invention has been shown and described herein, it should be realized that there may be many modifications, substitutions and alterations thereto.

The embodiments of the invention in which an exclusive property or privilege is claimed are defined as follows:

1. A hybrid TV frequency modulation feedback loop (FMFB) remote volume control includes an RF input including video and aural carriers with common mode spurious deviation (CMSD) thereon, an intercarrier audio detection circuit connected thereto and providing a baseband audio signal, means for varying the amplitude of said baseband audio signal, means connected to said input for using the video carrier to provide a signal representative of CMSD, and means for combining the CMSD signal, the amplitude controlled baseband audio signal and providing an aural carrier signal having CMSD and amplitude controlled audio.

2. The FMFB of claim 1 further characterized in that the means for using the video carrier to provide a signal representative of CMSD includes mixing means having one input of the video carrier with CMSD, an aural carrier voltage controlled oscillator (VCO) having a deviation control signal input connected to said mixing means and providing another input thereto, with the output from said mixing means being a signal at IF frequency with CMSD, means for demodulating the IF signal output from said mixing means to provide a signal proportional to CMSD, means for combining the signal proportional to CMSD and the baseband audio signal to provide an input to said VCO to provide the deviation control signal therefor.

3. The FMFB of claim 2 further characterized in that said mixing means is connected to said RF input, filter means between said RF input and said mixing means for removing the aural carrier.

4. The FMFB of claim 1 further characterized ih that the means for using the video carrier to provide a signal representative of CMSD includes a mixing means having one input of the video carrier with CMSD, an IF frequency VCO having a deviation control signal input connected to said mixing means and providing another input thereto, with the output of said mixing means being an aural carrier signal with CMSD and amplitude controlled audio, the deviation control for said VCO being provided by the baseband audio signal.

5. The FMFB of claim 4 further characterized by and including circuit means for providing a video carrier with CMSD injection locked to the video carrier at the RF input.

6. The FMFB of claim 1 further characterized by and including a splitter connected to said RF input, one output of said splitter being connected to the means for using the video carrier to provide a signal representative of CMSD, another output of said splitter being connected to the intercarrier audio detector.

7. The FMFB of claim 6 further characterized in that said intercarrier audio detector includes a mixer having inputs of the video and aural carriers and an output of IF frequency with CMSD removed, means connected to said mixer output for demodulating the IF signal to provide baseband audio, and means for varying the amplitude of said baseband audio to provide remote volume control.

* * * * *